United States Patent [19]

Tults

[11] Patent Number: 4,623,925
[45] Date of Patent: Nov. 18, 1986

[54] TELEVISION RECEIVER HAVING CHARACTER GENERATOR WITH NON-LINE LOCKED CLOCK OSCILLATOR

[75] Inventor: Juri Tults, Indianapolis, Ind.
[73] Assignee: RCA Corporation, Princeton, N.J.
[21] Appl. No.: 666,862
[22] Filed: Oct. 31, 1984
[51] Int. Cl.[4] .................. H04N 5/04; H04N 5/262
[52] U.S. Cl. .................... 358/183; 358/148; 358/149
[58] Field of Search .............. 358/183, 188, 192.1, 358/22, 149, 148, 167, 166, 36, 37

[56] References Cited

U.S. PATENT DOCUMENTS

| | | | |
|---|---|---|---|
| 3,454,719 | 7/1969 | Horstmann | 358/149 |
| 4,281,345 | 7/1981 | Warn | 358/149 |
| 4,346,407 | 8/1982 | Baer et al. | 358/149 |
| 4,464,679 | 8/1984 | Wargo | 358/148 |
| 4,477,841 | 10/1981 | Chen et al. | 358/335 |

OTHER PUBLICATIONS

An introduction to the MB88303 Television Display Controller, published by Fujitsu, Ltd., Second English Ed., Nov. 1982.

Primary Examiner—Tommy P. Chin
Attorney, Agent, or Firm—P. J. Rasmussen; P. M. Emanuel; R. G. Coalter

[57] ABSTRACT

A character generator in a receiver provides a character signal in raster scan form for display with a received video signal. An oscillator, not synchronized with the horizontal synchronizing component of the video signal, supplies a clock signal to the generator for controlling timing of character elements. A control unit provides a control signal representative of a time difference between the clock signal and the horizontal synchronizing component. A delay unit, interposed in the clock signal path, selectively imparts delay to the clock signal in response to the control signal for reducing line-to-line variations in the timing of displayed character elements.

4 Claims, 3 Drawing Figures

TELEVISION RECEIVER HAVING CHARACTER GENERATOR WITH NON-LINE LOCKED CLOCK OSCILLATOR

FIELD OF THE INVENTION

This invention relates to television receivers or monitors of the type having a character generator for producing alphanumeric characters or graphic symbols in raster scan form for display along with (or in place of) a received "picture" signal and which includes a clock for controlling the timing of picture elements produced by the character generator.

BACKGROUND OF THE INVENTION

Raster scan caption generators are useful in television receivers for displaying various types of information such as teletext data, time and channel settings, computer data and so on. In a typical generator individual alphanumeric characters or graphic symbols are represented by a dot matrix pattern stored in a read only memory (ROM). A character is generated for display by transferring a desired dot pattern from the ROM to a high speed buffer and sequentially shifting the character "dots" or "pixels" (picture elements) out of the buffer with a pixel or dot clock. The serial signal, thus formed, is applied to a kinescope in a timed relation to the vertical and horizontal sweep so as to display the dot matrix pattern at a desired location on the raster.

In a known form of on-screen display (OSD) character generator used in television receivers, an inductance-capacitance (LC) or resistance-capacitance (RC) oscillator is used for providing the clock signal which determines the timing of character elements or "pixels" provided by the character generator. The oscillator frequency (about 5 MHz) determines the width of the smallest element of displayed characters. The oscillator must be synchronized or "line-locked" with the horizontal scanning signal to avoid a ragged or noisy appearance of vertical edges of displayed characters. Typically, the oscillator is of the "start-stop" kind which is disabled during the presence of the horizontal synchronizing pulse and enabled at the termination of the synchronizing pulse.

Where the oscillator is included on the same integrated circuit with the OSD character generator, two pins of the integrated circuit must be "dedicated" to providing connections for discrete external frequency determining components (e.g., RL or RC elements). These external components of the oscillator present a potential source of radiation which may interfere with other signals in the receiver and so require filtering to prevent artifacts from appearing in displayed images. A further problem is that tolerance variations of the LC or RC oscillator components may require a factory adjustment for correct positioning of displayed characters. Also, changes in operating temperature and aging of circuit components can result in noticeable changes in the horizontal position of displayed characters. Further disadvantages are that at least one of the oscillator elements in the known system must be frequency adjustable and the external elements require printed circuit board space for mounting which adds to the overall cost of the OSD feature of the television receiver.

Television receivers are known which include a 4 MHz crystal oscillator as a signal source for a frequency synthesis type of tuner. Receivers are under consideration wherein on-screen display logic is to be included on the same integrated circuit as the frequency synthesis tuning system. In view of the foregoing, it is herein recognized that it would be advantageous to use the existing 4 MHz crystal oscillator as a clock source for the OSD character generator. Heretofore, this possibility has not been considered to be practical for various reasons. For example, the 4 MHz oscillator must be running continuously to satisfy the requirements of the tuning system. But even if it were possible some way to re-design the frequency synthesizer logic to work with a start-stop oscillator, a crystal oscillator can not be started quickly enough to meet the needs of the OSD generator because of the very high "Q" of the crystal. When a typical crystal oscillator is enabled the oscillations build up slowly in a period of time measured in milliseconds. This is simply too slow to meet the clock timing requirements of an OSD character generator.

SUMMARY OF THE INVENTION

The present invention is directed to meeting the need for a reduction in line-to-line variations in the timing of character elements provided by a character generator in a television receiver where the character generator is clocked by a free running oscillator. As used herein, "free running" means that the oscillator is not locked to the line frequency of the video input signal supplied to the receiver (although it may have a very stable and accurate frequency).

A receiver embodying the invention comprises a display means and a video processing means coupled to supply a video output signal to the display means, the video output signal having a horizontal synchronizing component. An oscillator means provides a clock signal that is not synchronous with the horizontal synchronizing component of the video output signal. A character generator means supplies a character signal in raster scan form to the display means for display with the video output signal, each line of the character signal comprising a plurality of character elements. The character generator means has a timing clock input coupled via a clock signal path to the oscillator means for controlling the timing of the character elements in accordance with the clock signal. A measuring means responsive to the video output signal and to the clock signal provides a control signal representative of a time difference between a given transition of the clock signal and the horizontal synchronizing component of the video signal. A delay means is interposed in the clock signal path for effectively imparting delay to the clock signal supplied to the character generator means in response to the control signal for reducing line-to-line variations in the timing of the character elements.

BRIEF DESCRIPTION OF THE DRAWING

The invention is illustrated in the accompanying drawing wherein like elements are denoted by like designators and in which.

DETAILED DESCRIPTION

Figure 1:
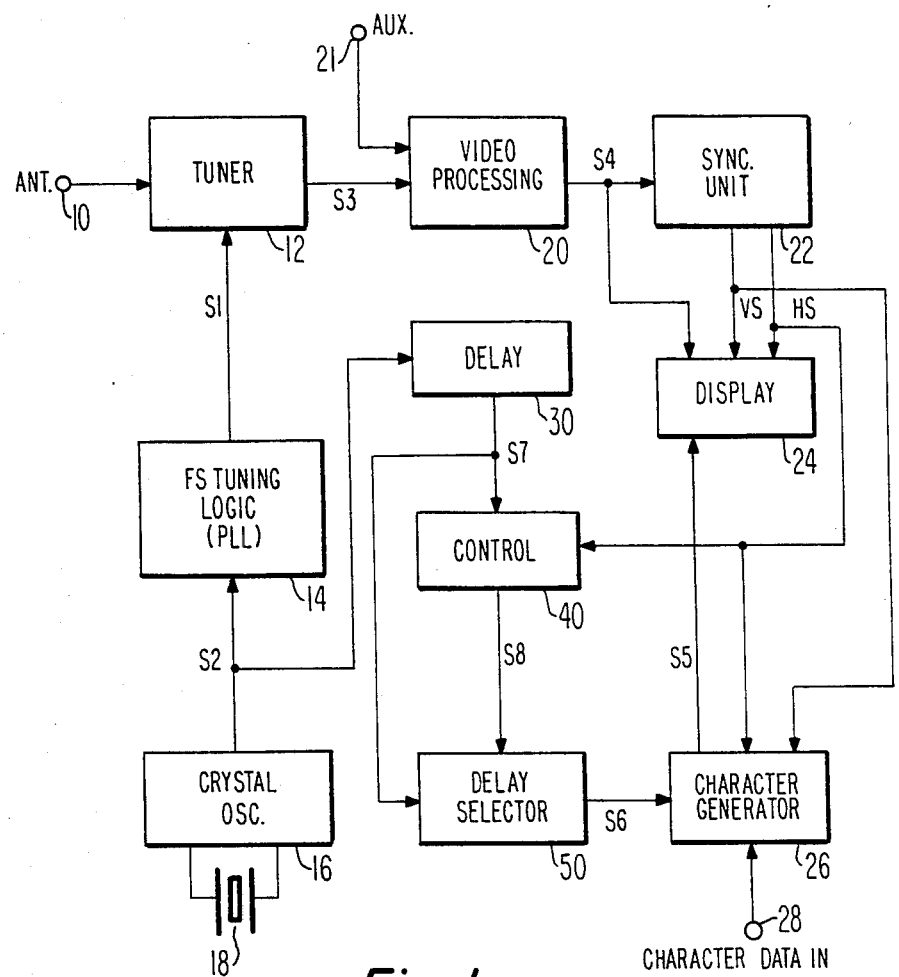
FIG. 1 is a block diagram of a television receiver embodying the invention.

The receiver of FIG. 1 includes an antenna input terminal 10 for connection to a source of RF modulated video signals such as a standard broadcast signal, a cable signal or the RF output of a video tape recorder, a video disc player, computer, a video game unit or the like. Terminal 10 is coupled to the input of a voltage controlled tuner 12 which is able to select a particular one of a relatively large number of television channels by tuning control voltage on signal S1 supplied thereto. The tuning control signal S1 is provided by means of a conventional FS (frequency synethesis) tuning logic unit 14 (e.g., a phase lock loop, PLL). Unit 14 multiplies the frequency of a reference signal S2 provided by a crystal oscillator 16 by a number related to the desired television channel selected by the user of the receiver. The frequency of the crystal 18 which controls oscillator 16 is typically about 4 MHz (e.g., 3.90625 MHz) for NTSC standard TV Channel assignments.

The output signal S3 of tuner 12 is an IF (intermediate frequency) signal corresponding to the TV channel selected by the user of the receiver by means of tuning logic unit 14 and is applied to a video processing unit 20 which includes a conventional IF amplifier, video detector and other video signal processing circuits (e.g., hue and saturation controls, AGC circuits, etc.). Unit 20 includes an auxiliary (AUX.) input terminal for connection to a source of baseband video input signal in so-called "monitor" applications when the tuner 12 is not used. The processed baseband video signal S4 provided by unit 20 is applied to a conventional synchronizing unit 22 and to a display unit 24 (e.g., a kinescope, projection unit or the like). Unit 22 generates vertical synchronizing signals (VS) and horizontal synchronizing signals (HS) for display unit 24 so as to display the signal S4 in conventional raster scan form on unit 24.

The receiver includes a raster scan character generator 26 having an input terminal 28 for connection to a source of character data (e.g., time, channel identification, teletext, etc.) to be displayed on unit 24 along with (or in place of) the video signal S4 and an output for supplying the character data signal (S5) in raster scan form to unit 24. Generator 26 is of conventional design and includes inputs coupled to receive the vertical and horizontal synchronizing signals (VS and HS, respectively) provided by synchronizing unit 22 for controlling the position of alphanumeric data or graphic symbols to be displayed on unit 24.

In accordance with a first aspect of the invention, the timing of individual character elements (i.e., character "dots" or "pixels") of the character signal S5 is controlled by means of a high frequency clock signal S6 derived from the "free-running" oscillator 16. The term "free-running" as used herein, means that oscillator 16, although very stable and accurate, is not synchronized with the horizontal synchronizing component of the video signal S4 and therefore the clock signal S2 has an indeterminate phase or timing relationship with the horizontal synchronizing component HS of video signal S4.

The clock signal S6 is produced by applying the crystal oscillator signal S2 to a delay unit 30 which generates a plurality of phases of the (4 MHz) clock signal S2. In essence, control unit 40 compares the horizontal synchronizing signal HS with the output signal S7 of delay unit 30 to identify the particular one of the multi-phase clock signals which happens to be most closely in-phase with a specified point on the horizontal synchronizing signal waveform as will be explained subsequently. Unit 40 supplies a clock delay identification signal S8 to a delay selector unit 50 which, in turn, selects the most closely in-phase ones of the delayed clock signals S7 for application to the clock input terminal 27 of charactor generator 26.

Summarizing the foregoing, control unit 40 in combination with delay unit 30 measures the phase or time difference between a given point on the horizontal synchronizing signal HS and the clock signal S2 at the start of each line and, by means of delay selector 50, effectively imparts a delay to the signal S2 to maintain the phase of the clock signal S6 supplied to generator 26 relatively constant with respect to the horizontal synchronizing signal HS on a line-by-line basis. The "jitter" or line-to-line timing variations of the processed (delayed) clock signal S6 is reduced in proportion to the number of phases of the signal S7 produced in delay unit 30. If, for example, a clock cycle is divided into eight phases, then the maximum line-to-line jitter of displayed character dots or pixels produced by generator 26 will correspond to only one-eighth of one clock cycle. Accordingly, even though the clock signal S2 is not phase locked to the horizontal synchronizing signal HS, characters displayed on unit 24 (which is synchronized with HS) will have a uniform vertical alignment. Thus, in the receiver of FIG. 1 a separate "line-locked" oscillator is not needed for character generation. Moreover, the "on screen display" logic elements (30, 40, 50, 26) may be incorporated on the same integrated circuit as the FS tuning logic unit 14 thereby eleminating the need for any additional clock input pins for the character generator 26.

Figure 2:
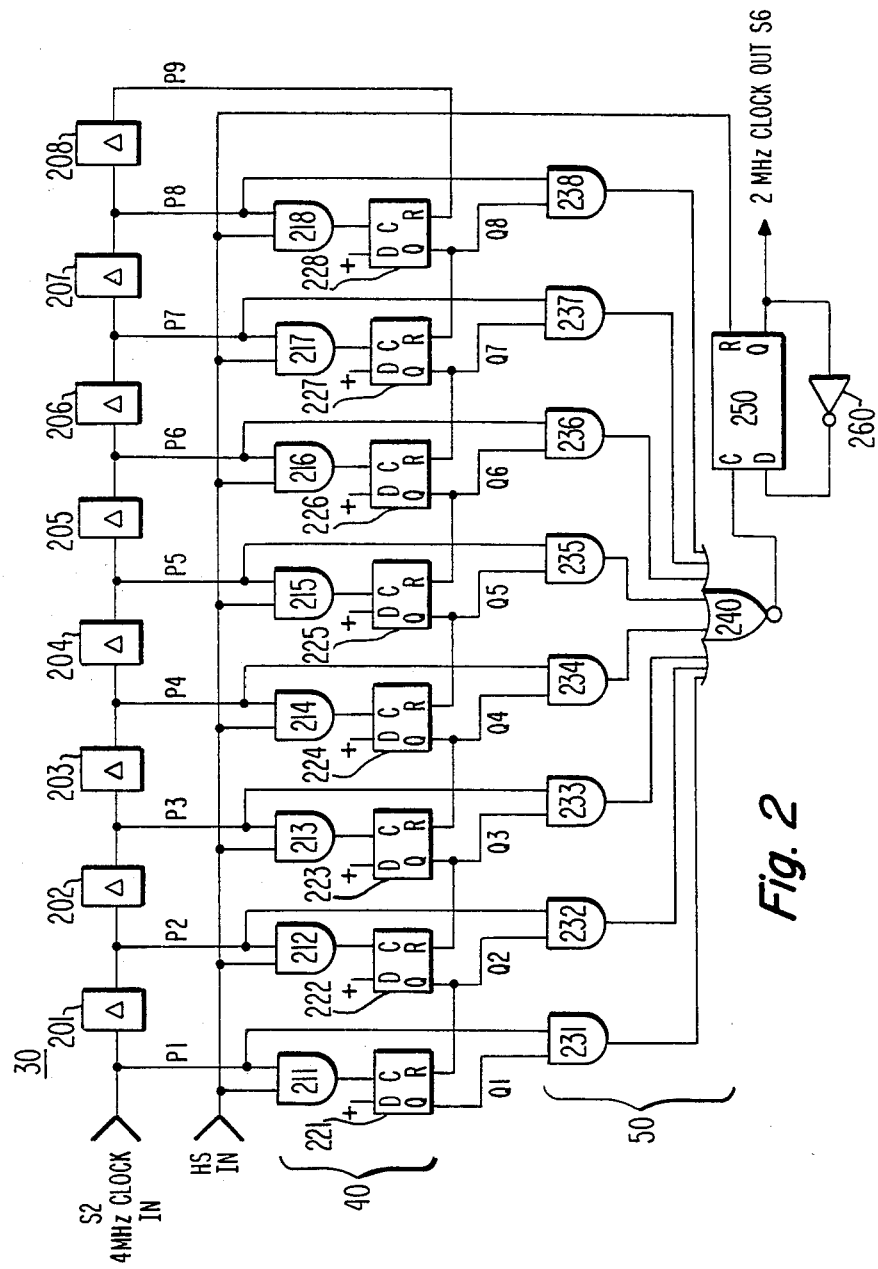
FIG. 2 is a detailed block diagram of clock delay and control elements of the receiver of FIG. 1.

FIG. 2 is a detailed logic diagram illustrating a specific implementation of units 30, 40 and 50 of FIG. 1. The delay unit 30 comprises a cascade connection of eight delay elements (201–208) having an input coupled to receive the 4 MHz clock signal S2 and output taps for providing individual phases of the clock signal (P1–P9). The total delay of the delay line should be somewhat greater than the period of one (1) cycle of the 4 MHz clock signal S2, e.g., about 300 to 400 nano-seconds. Such a delay can be realized in a polysilicon signal path of appropriate lenght on an NMOS integrated circuit. Alternatively, the desired delay may be implemented by means of a series of inverters, two (2) between each tap point.

Figure 3:
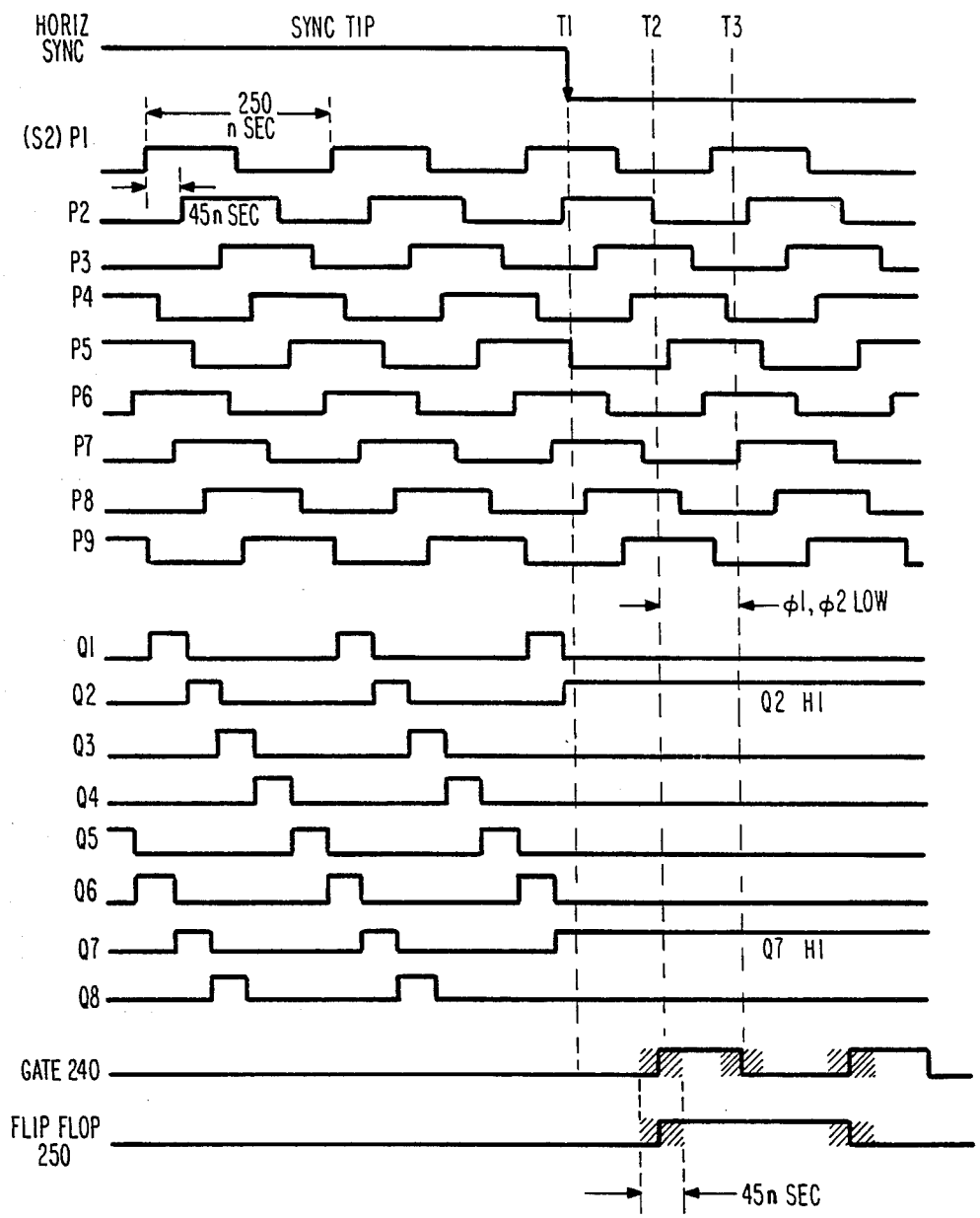
FIG. 3 is a waveform diagram illustrating certain aspects of operation of the delay and control elements of FIG. 2.

As illustrated in FIG. 3, each section (201–208) of delay line 30 delays the 4 MHz clock signal S2 by about 45 nano-seconds. Shorter or longer delays can be utilized depending on how many different phases are desired for reducing the edge jitter of displayed characters. Since, as a practical matter, a delay of exactly 45 nano-seconds can not be controlled precisely from unit to unit in a conventional manufacturing process or may be subject to variation with temperature or voltage, the logic circuits are designed to accomodate reasonable changes in the delays. Specifically, the total nominal delay of unit 30 is selected to be about 315 nano-seconds which is longer than the 250 nano-seconds period of the 4 MHz clock signal S2 to allow for delay line tolerance variations.

Unit 40, comprises eight AND gates 211–218, each having a first input coupled to receive the horizontal synchronizing signal HS, a second input coupled to receive a respective one of the clock signal S2 phases (P1–P9) and an output coupled to the clock input ("C")

of a respective one of eight data ("D") type flip-flops 221–228. The data ("D") input of each flip-flop is connected to a source (not shown) of positive potential corresponding to a logic "1" value. Each flip-flop has a reset input (R) coupled to the "true" (Q) output of the immediately following flip-flop with the reset input of the last flip-flop 228 being coupled to receive the output of delay element 208 (i.e., phase P9).

Delay selector unit 50 comprises eight AND gates 231–238, each having a first input coupled to receive a respective one of the clock phase signals (P1–P8) and having a second input coupled to receive a corresponding one of the flip-flop output signals Q1–Q8. Gate 231, for example, receives P1 and Q1 as inputs. The remaining gates are similarly connected. All outputs of gates 231–238 are applied to an eight-input NOR gate 240 which has an output coupled to the clock (C) input of a "D" flip-flop 250. An inverter 260 applies the Q output of flip-flop 250 to its D (data) input to condition flip-flop 250 to divide the frequency of the pulses applied to its clock input by two. The horizontal synchronizing signal HS is applied to the reset input of flip-flop 250 to provide a consistant starting phase for the division process.

In operation, delay unit 30 provides the nine phases of the clock signal S2 as previously noted. When the horizontal synchronizing signal is high (i.e., sync tip interval, FIG. 3) gates 211–218 are all primed to apply respective ones of clock phases P1–P9 to the clock input terminals of flip-flops 221–228. Since each flip-flop resets the one preceding it, the flip-flops are clocked sequentially by the phase signals to provide "Q" output signals as shown in FIG. 3.

At time T1 the horizontal synchronizing pulse HS makes a transition to logic zero thereby disabling each of AND GATES 211–218. As a result the sequential clocking of flip-flops 221–228 stops and all retain their state at the time T1 when the sync pulse "ended". From the wave forms Q1–Q8 it is seen that at time T1 only flip-flops 222 (Q1) and 227 (Q7) were in a SET condition. This enables AND gates 232 and 237. The remaining AND gates 231, 233–236 and 238 are all disabled since the corresponding flip-flops are reset.

During the interval T1–T2 the outputs of all disabled gates are zero and the outputs of the two primed gates 232 and 237 are high because in this interval clock phases P2 and P7 are both high. Accordingly, the output of NOR gate 240 is low (logic zero). At this time flip-flop 250 is in a reset condition having been reset from the last horizontal synchronizing pulse supplied to its reset input. At times T2–T3 clock phase P2 and phase P7 are both low thereby disabling gates 232 and 237. For this condition all eight inputs to NOR gate 240 are low and the output of gate 240 makes a positive transition and remains high until clock phase P7 disables gate 237 at time T3. Flip-flop 250 is triggered by the positive transition of the output of gate 240 to provide the first half-cycle of the output clock signal S6.

Thereafter, for the remainder of the line, flip-flop 250 is triggered (clocked) by the trailing edge of clock phase P2 which, as shown, is the closest phase of signal S2 with respect to the signal HS at the moment of the negative transition of signal HS. Since there is a constant delay of one-half of one cycle of signal S2 in clocking flip-flop 250, the phase of the output clock signal S7 is delayed with respect to the trailing edge of signal HS by 125 nano-seconds. The pulse to pulse jitter of signal S7 corresponds to the delay time of one stage of unit 30 which, in this example of the invention, is 45 nanoseconds.

What is claimed is:

1. A television receiver, comprising:
   display means;
   video processing means coupled to supply a video output signal to said display means, said video output signal having a horizontal synchronizing component;
   oscillator means for providing a clock signal asynchronous with said horizontal synchronizing component;
   character generator means having an output coupled to said display means for supplying a character signal thereto in raster scan form for display with said video output signal on said display means, each line of said character signal comprising a plurality of character elements, said character generator means having a timing clock input coupled via a clock signal path to said oscillator means for controlling the timing of said character elements in accordance with said clock signal, said character elements tending to exhibit jitter due to said clock signal being asynchronous;
   synchronization means responsive to said horizontal synchronizing component of said video output signal and to said clock signal for imparting a delay to the clock signal supplied to said character generator means in response to the time relationship between said horizontal synchronization component and said clock signal; and wherein
   said synchronizing means comprises variable delay means in said clock signal path and means for measuring said time relationship and changing said delay of said variable delay means to minimize said jitter of displayed characters.

2. A television receiver, comprising:
   display means;
   video processing means coupled to supply a video output signal to said display means, said video output signal having a horizontal synchronizing component;
   oscillator means for providing a clock signal asynchronous with said horizontal synchronizing component;
   character generator means having an output coupled to said display means for supplying a character signal thereto in raster scan form for display with said video signal on said display means, each line of said character signal comprising a plurality of character elements, said character generator means having a timing clock input for controlling the timing of said character elements in accordance with said clock signal;
   delay means coupled to said oscillator means for providing a plurality of phases of said clock signal;
   control logic means coupled to said delay means for providing an indicator signal for identifying at least one of said phases having a specified timing relation to said horizontal synchronizing component of said video output signal; and
   delay selection logic means coupled to said taps and responsive to said indicator signal for coupling said at least one of said phases to said timing clock input of said character generator means for reducing line-to-line variations in timing of said character elements.

3. A television receiver, comprising:

display means;

video processing means coupled to supply a video output signal to said display means, said video output signal having a horizontal synchronizing component;

oscillator means for providing a clock signal asynchronous with said horizontal synchronizing component;

character generator means having an output coupled to said display means for supplying a character signal thereto in raster scan form for display with said video output signal on said display means, each line of said character signal comprising a plurality of character elements, said character generator means having a timing clock input coupled via a clock signal path to said oscillator means for controlling the timing of said character elements in accordance with said clock signal;

synchronization means responsive to said horizontal synchronizing component of said video output signal and to said clock signal for imparting a delay to the clock signal supplied to said character generator means in response to the time relationship between said horizontal synchronization component and said clock signal; and wherein said synchronizing means comprises delay means coupled to said oscillator means and having a plurality of taps, control means coupled to said taps for detecting transitions of delayed clock signal phases with respect to said horizontal synchronizing component of said video output signal and providing a control signal; an output terminal for coupling said clock signal to said character generator means; and selector means responsive to said control signal for selectively coupling said taps to said output terminal.

4. A television receiver, comprising:

display means;

television tuner means of the frequency synthesis type for receiving an RF video input signal and providing a baseband video output signal to said display means, said baseband video output signal having a horizontal synchronizing component;

character generator means coupled to supply a character signal to said display means;

oscillator means coupled to supply a clock signal to said tuner means for controlling TV channel selection and coupled to supply said clock signal to said character generator means for controlling pixel generation, said clock signal being asynchronous with said horizontal synchronizing component thereby tending to cause jitter of displayed characters; and jitter correction means comprising a variable delay means for imparting a delay to said clock signal supplied to said character generator means and a control means responsive to said clock signal produced by said oscillator means and to said horizontal synchronizing component of said video output signal for varying said delay in a sense to minimize said jitter of said displayed characters.

* * * * *